United States Patent [19]

Stenkvist et al.

[11] 4,324,943
[45] Apr. 13, 1982

[54] DC ARC FURNACE HEARTH CONSTRUCTION

[75] Inventors: Sven-Einar Stenkvist; Bo Rappinger, both of Västerås, Sweden

[73] Assignee: ASEA Aktiebolag, Västerås, Sweden

[21] Appl. No.: 162,392

[22] Filed: Jun. 23, 1980

[30] Foreign Application Priority Data

Jun. 26, 1979 [CH] Switzerland .......................... 7905584

[51] Int. Cl.³ .............................................. H05B 7/00
[52] U.S. Cl. ........................................ 373/72; 373/108
[58] Field of Search .................... 13/9 R, 11, 35, 12

[56] References Cited

U.S. PATENT DOCUMENTS

| 941,419 | 11/1909 | Keller | 13/18 R |
|---|---|---|---|
| 3,832,478 | 8/1974 | Books | 13/35 |
| 3,916,047 | 10/1975 | Niesen | 13/35 |
| 3,952,140 | 4/1976 | Wunsche | 13/35 |

Primary Examiner—Roy N. Envall, Jr.
Attorney, Agent, or Firm—Kenyon & Kenyon

[57] ABSTRACT

A DC arc furnace hearth is formed by brickwork having electric conductors extending through it, the conductors at their bottoms connecting with an electrically conductive layer on which the brickwork is layed and having top ends contacted by a melt contained by the brickwork. Arcing power can be transmitted via the conductive layer and conductors to the melt.

7 Claims, 2 Drawing Figures

DC ARC FURNACE HEARTH CONSTRUCTION

BACKGROUND OF THE INVENTION

A new DC arc furnace hearth is disclosed by the Stenkvist application Ser. No. 15,587 filed Feb. 27, 1979 now U.S. Pat. No. 4,228,314, issued Oct. 14, 1980. This hearth is electrically conductive so that when constructed as part of a DC arc furnace, the arcing power can be transmitted via the hearth to a melt on the hearth and via an arc to an arcing electrode above the melt.

When used, for example, in a conventional DC arc furnace construction, carbon bricks are layed on an electrically conductive metal plate which can be connected to the DC arc power, the plate and carbon brickwork embracing an extended area. Possibly with a graphite layer layed on the carbon bricks, the usual electrically non-conductive granular refractory compound is installed. Steel rods are then driven down through this compound so as to engage the carbon brickwork or penetrate the graphite layer if used, the tops of the rods being exposed to the surface of the granular compound. Then the compound is dried and sintered as usual so that an electrically conductive hearth is formed. DC power connected to the plate on which the carbon bricks are layed is conducted via the carbon brickwork and the graphite layer if used, through the steel rods to a charge on the hearth and to the arc of an arcing electrode above the charge.

Important advantages are obtained from this hearth construction. The steel rods are installed in the form of a cluster extending substantially coextensively with the melt, and the bars can be arranged symmetrically around the arcing electrode conventionally positioned concentrically with respect to the hearth and, of course, the furnace wall. The use of a starting electrode, the requirement for a special furnace construction providing for side melt contact electrodes, and the problems of arc angularity, are all eliminated.

However, this does have one disadvantage, namely, the need for drying and sintering, or burning-in, the granular material forming the hearth surface, before it can contain the furnace melt. This procedure, required as well by all conventional hearth constructions, has always involved environmental problems, has been known to weaken the refractory furnace wall, particularly when it is of monolithic construction, and sometimes damages the integrity of the hearth itself.

The object of the present invention is to continue to enjoy the advantages of this Stenkvist application hearth while at the same time eliminating the need for the drying and sintering of the granular compound layer.

SUMMARY OF THE INVENTION

According to the present invention, the general construction of the Stenkvist application hearth is used, but with the difference that bricks are layed so as to build a wall by itself adapted to contain the melt. These bricks are layed on the electrically conductive layer of carbon bricks, possibly with the graphite layer intervening. The carbon bricks are, in turn, layed on the metal plate which carries the DC arc power throughout the carbon brickwork.

This brick wall which contains the melt and is directly contacted by the melt in an arc furnace using this new hearth construction, is built from refractory bricks which are electrically non-conductive at least to a degree preventing them from conducting the arc power to the melt from the conductive layer or layers on which they are layed. To provide the necessary conduction of current, the bricks are designed so that when layed, electric conductors can extend through the resulting non-conductive brickwork layer, the conductors extending from the electrically conductive layer or layers below, upwardly so as to be exposed at the brickwork's surface directly contacted by the melt.

The bricks can be shaped to form vertical passages through the non-conductive brickwork and through which the conductors in the form of metal bars can be positioned either during the laying of the bricks or possibly thereafter. Alternately, metal encased bricks can be used. Otherwise, brick laying can be conventional.

DESCRIPTION OF THE DRAWINGS

The accompanying drawings illustrate what can be a conventional DC arc furnace excepting that it has an electrically conductive hearth constructed in accordance with the present invention, the various views being as follows.

DETAILED DESCRIPTION OF THE INVENTION

In the following it is assumed that the reader is familiar with metallurgical furnace refractories in general, and particularly massive refractories, or in other words, bricks. If not, reference may be made to the text *THE MAKING, SHAPING AND TREATING OF STEEL*, 7th Edition, published by the U.S. Steel Corporation, and particularly Chapter 8 of this text with particular emphasis on §2 of this chapter. This text by reference is made a part of the following.

The illustrated furnace is of the type used for the melt reduction of iron oxides, usually in the form of powdered iron ore, possibly prereduced to some extent, and which is fed through a tubular arcing electrode into a carbonaceous iron melt so that a reaction occurs between the oxides and the carbon reducing the oxides to molten iron. The melt continuously increases in volume and is from time to time tapped as required. The furnace can operate continuously until it must be shut down for repairs to either the lining or the hearth. The electrode used is consumable, such as by being either carbon, graphite or of the Soderberg type, and is tubular in the sense that it has an axially extending feeding passage for the powdered material, and is preferably operated so that the melt is anodic and the electrode is cathodic.

With the above introduction, the furnace may have the usual side wall lining 1 and is enclosed by the customary steel shell 2 with the tubular electrode 3 depending through an opening in the furnace roof, the feeding passage being shown at 4 extending axially through the electrode. Although the details are not shown, it is assumed to be of the usual rocking type, the melt pouring spout being indicated at 5 and the deslagging port at 6.

Figure 1:
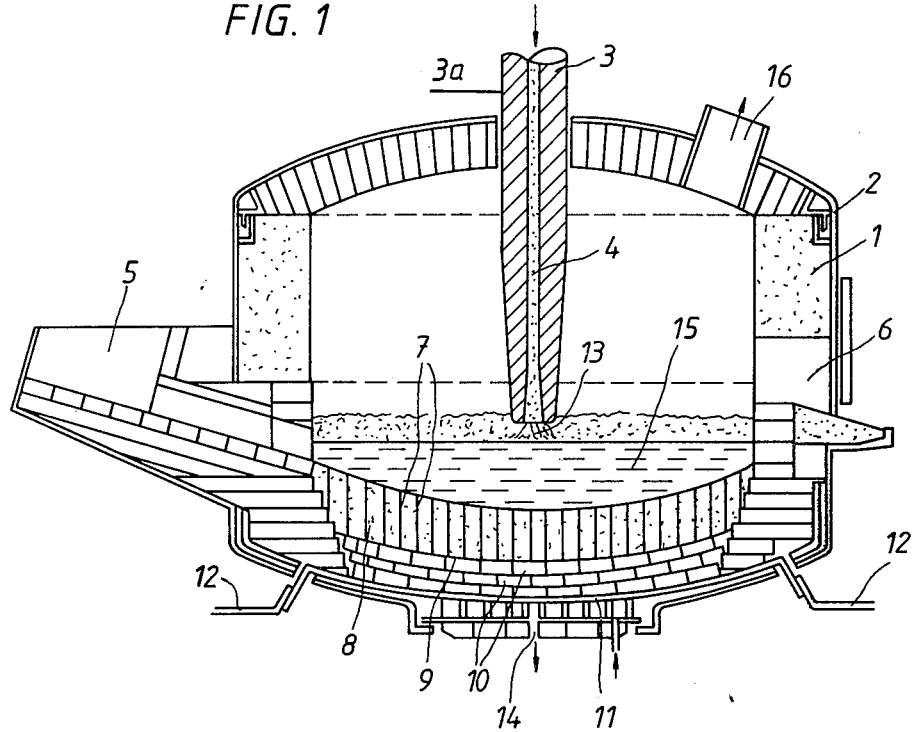
FIG. 1 is a vertical section through the furnace.

In FIG. 1 the electrically conductive hearth, like the Stenkvist application hearth, has the relatively wide cluster of vertical metal electric conductors 7, but in this case the conductors are built into bricks 8 layed to form the brickwork wall containing the melt. No sintered layer of refractory granules is used. These conductors 7 at their upper portions are exposed directly to the melt and extend downwardly through the electrically non-conductive refractory brickwork, with their lower portions electrically contacting the layer of graphite 9 which in this case is used on top of the carbon bricks 10. The electrically conductive carbon bricks are layed in one or a number of layers on the metal plate 11 having the externally extending terminals 12. This metal plate and the brickwork of carbon bricks 10 are substantially coextensive with the top surface of the hearth and, therefore, with the entire area of the melt, assuring the formation and maintenance of a truly vertical non-angular arc 13. The metal plate forms the hearth electrical connection and is preferably provided with air or liquid cooling as indicated at 14, so that the plate does not become excessively hot. Via the terminals 12 DC arc current can travel from the plate through the carbon bricks 10, graphite layer 9, conductors 7 extending through the bricks 8, melt 15, arc 13 and to the arcing electrode 3 which is electrically connected to the power circuit as indicated at 3a. Normally the connections are such as to make the melt 15 anodic and the electrode 3 cathodic. The usual removable roof is shown with a gas exhaust 16.

When the furnace is in operation, practicing the technique of the melt reduction of iron oxides, the crude iron melt 15 is maintained highly carbonaceous. The reaction between the oxides such as powdered iron ore, and the carbon in the melt is endothermic, the added heat required being provided by the arc. Because the melt has the characteristically very high carbon content of the oxide melt reduction practice, its melting temperature can be relatively low.

Figure 2:
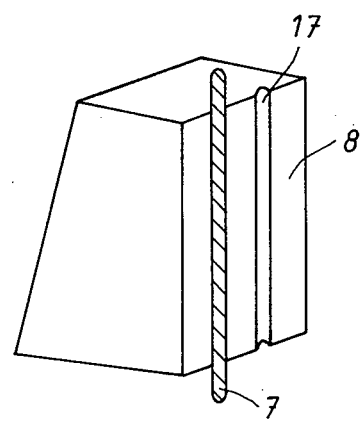
FIG. 2 is a perspective view showing an example of a suitable brick shape.

One example of a brick suitable for use to lay up the brickwork hearth layer 8, which may comprise more than one layer of bricks if they can be suitably registered vertically from one layer to another, is shown by FIG. 2. Here the brick 8 has one side which will interface the next brick side, provided with a vertical groove 17 in which a steel bar 7 can be positioned and fully enclosed when two correspondingly sided bricks are layed together. The rod or bar 7 is illustrated as being in the form of a length of concrete reinforcing bar, such as is commercially available as a merchant-bar product. Being steel, its composition is compatible with the carbonaceous iron melt 15. When corresponding bricks are layed together with the bars 7 installed between their mutually registered vertical grooves 17, refractory cement may be used between them and allowed to set. Although heat may be used to accelerate the setting or drying, and is always used to some extent for drying before any furnace is started up, this heat is very modest compared to that required to dry and sinter the usual granular hearth bottom surfacing compound. If used, cement between the bricks may be loaded with carbon or other material so that the cement itself is conductive, possibly in some instances even eliminating the need for the bars 7.

The compositions of refractory bricks suitable for use with this invention are known, and the bricks may be shaped by any of the techniques used when making refractory bricks for metallurgical furnace installations. Such techniques make it possible to mold or cast or press the bricks 8 with the grooves or channels 17 or, if desired, with vertical holes (not shown). When the side grooves 17 are used, the bars can be placed in position during the brick laying. If holes are provided through the bricks, the bars can be installed simply by dropping them into the holes after brick-laying.

Metal-cased refractory bricks are also commercially available and may be used, relying on the casings alone to carry the current to the melt from the conductive layer underneath the metal encased bricks. Such bricks are conventionally made by pressing a steel jacket onto the brick during the actual forming operation, after which the brick is dried out, typically at temperatures less than 500° F. to develop maximum cold strength. It is to be understood that bricks are often heated to higher temperatures for drying or burning, but this is done at the brick factory and not at the arc furnace installation. Metal encased bricks are often a chemically bonded basic brick product.

The carbon bricks 10 can be replaced by other adequately conductive bricks such as those comprising a considerable amount of graphite, exemplified here by magnesite-graphite bricks containing about 20% graphite. The refractory bricks 8 should be selected so that they meet the requirements of holding the melt 15 by providing adequate refractory and erosion-resisting properties. The conductors 7, when in the form of concrete reinforcing bars, should have their lower ends projecting far enough to embed in the graphite layer 9. If this layer is not used, the uppermost layer of electrically conducting bricks 10 can be formed with holes into which the lower ends of the bars 7 can insert. Although the upper ends of the bars need only be flush with the top surface of the brickwork formed by the electrically non-conductive refractory bricks 8, they can extend a little upwardly beyond the upper surface of the brickwork layer formed by the bricks 8.

Metal-encased bricks have a relatively thin-walled steel jacket. However, this is adequate to carry the arc power because when using such bricks, a large multitude of the steel jackets extend vertically from the electrically conductive layer below, to the melt.

Refractory bricks, such as are conventionally used for metallurgical furnace constructions, are less expensive than the carbon bricks forming the electrically conductive layer 10 formed by the multiplicity of layers of carbon bricks. Ordinary brick laying techniques may be used to lay the bricks 8 whether having the grooves illustrated by FIG. 2 or when using the metal encased bricks. All such bricks can be obtained commercially made to the dimensions and shapes required by a furnace installation.

It follows that when the new furnace bottom requires repair, the expensive electrically conducting bricks 10 do not require any attention because they have been shielded during the service life of the hearth by the refractory non-conductive bricks above.

Another advantage of this new bottom is that the geometric arrangement of the cluster of conductors carrying the current from the conductive layer underneath to the melt can be effected with greater assurance than before. When using steel jacketed bricks, the distribution of conductors is made almost automatically. When using shaped bricks, such as illustrated by FIG. 2, the brick laying workmen can be provided with diagrams which they can follow accurately. A precise distribution of the conductors extending through the brickwork containing the melt assures a vertical, non-deflected arc between the arcing electrode and the melt. Incidentally, it is to be understood that sometimes more than one arcing electrode may be used, but in such a case the electrodes are as usual geometrically arranged concentrically with the furnace hearth and wall.

With this new hearth construction, the protective layer above the carbon bricks can be layed while maintaining good working conditions around the furnace and without deterioration of the atmosphere in the vicinity of the furnace having the hearth under construction. The bricks are preformed and dried and fired if necessary before reaching the furnace installation. Normally, when uncased refractory bricks are used, the vertical passageways are formed by the brick manufacturer so that the vertical conductors, such as concrete reinforcing bars, can be inserted in the passageways during the brick laying. When the side grooves are used and the bricks are layed side-by-side, the vertical passageways are formed and for easy installation the vertical rod or bar conductors can be installed during the brick laying. It is academically possible to use solid refractory bricks and to thereafter drill the vertical passageways in the bricks for installation of the conductors.

It is well known that a furnace must have its lining and bottom thoroughly dried by heating prior to being started up, but the heating involved by this does not have the disadvantages described in connection with sintering the granular refractory normally used as the top layer of a furnace hearth.

What is claimed is:

1. A DC arc furnace comprising an electrically conductive hearth adapted to containing a melt, at least one arcing electrode positioned above the hearth and adapted to form an arc with the melt, and means for connecting said hearth and electrode with DC power; wherein the improvement comprises said conductive hearth being formed by bricks layed so as to build a wall adapted to contain the melt and to be directly contacted by the melt, an electrically conductive layer on which the bricks are layed and is adapted to be connected with a DC power circuit including the arcing electrode, and electric conductors installed in said wall so as to extend from said layer upwardly to the wall's top surface so as to be contacted by the melt.

2. The furnace of claim 1 in which said conductors are formed by said bricks being metal encased bricks.

3. The furnace of claim 1 in which said bricks are preformed to provide vertical passageways and said conductors are installed in said passageways.

4. The furnace of claim 3 in which said passageways are formed by grooves in the sides of said bricks and the bricks are layed side-by-side so as to form the passageways between the bricks.

5. A DC arc furnace of the type used for the melt reduction of iron oxides and comprising an electrically conductive hearth adapted to contain a carbonaceous iron melt, at least one arcing electrode positioned above the hearth and adapted to form an arc with the melt, means for feeding iron oxides to the melt, and means for connecting said hearth and electrode with DC power; wherein the improvement comprises said hearth being formed by refractory bricks laid so as to form a wall adapted to be directly contacted by said melt, said bricks being electrically substantially non-conductive and forming the wall with clusters of vertical passages having a pattern fixed by the bricks, at least one layer of electrically conductive bricks on which said refractory bricks are laid, vertical electrical conductors positioned in said passages and having upper ends exposed so as to be contacted by said melt and lower ends in electrical connection with said electrically conductive bricks, and a metal plate having means for its connection with the DC power and on which said conductive bricks are laid in electrical connection with the plate.

6. The furnace of claim 5 in which said refractory bricks are preformed and ready for contact by said melt when laid and are shaped to form said vertical passages, and said conductors are steel bars positioned in said passages.

7. The furnace of claim 5 in which said refractory bricks are metal encased bricks laid with mutually adjacent sides forming said passages and their metal encasements forming said conductors.

* * * * *